United States Patent [19]

Burgdorf et al.

[11] 4,428,463
[45] Jan. 31, 1984

[54] RETAINING SPRING FOR THE BRAKE SHOE OF A SPOT TYPE DISC BRAKE

[75] Inventors: Jochen Burgdorf, Offenbach; Hans-Henning Luepertz, Darmstadt; Roberto Stoka, Nauheim, all of Fed. Rep. of Germany

[73] Assignee: ITT Industries Inc., New York, N.Y.

[21] Appl. No.: 289,014

[22] Filed: Jul. 31, 1981

Related U.S. Application Data

[63] Continuation of Ser. No. 135,019, Mar. 28, 1980, abandoned, which is a continuation of Ser. No. 970,896, Dec. 19, 1978, abandoned.

[30] Foreign Application Priority Data

Jan. 23, 1978 [DE] Fed. Rep. of Germany ....... 2802739

[51] Int. Cl.³ .............................................. F16D 65/00
[52] U.S. Cl. ................................................. 188/73.38
[58] Field of Search ......................... 188/73.36, 73.38; 192/300

[56] References Cited

U.S. PATENT DOCUMENTS

| 3,719,257 | 3/1973 | Maurice | 188/73.39 |
| 3,899,051 | 8/1975 | Grosseau | 188/73.38 |
| 4,055,237 | 10/1977 | Numazawa et al. | 188/73.35 |

FOREIGN PATENT DOCUMENTS

| 2151044 | 4/1973 | Fed. Rep. of Germany | 188/73.38 |
| 2262695 | 6/1973 | Fed. Rep. of Germany | |
| 2314700 | 10/1974 | Fed. Rep. of Germany | 188/73.38 |
| 2296126 | 7/1976 | France | 188/73.38 |
| 2354480 | 1/1978 | France | 188/73.36 |
| 4642252 | 11/1967 | Japan | 188/73.38 |

*Primary Examiner*—George E. A. Halvosa
*Attorney, Agent, or Firm*—John T. O'Halloran

[57] ABSTRACT

There is disclosed a retaining spring for a brake shoe of a spot-type disc brake having resilient arms which abut on guide pins at both sides of the brake shoe backing plate. The spring provides good alignment of the brake shoe parallel to the brake disc when the brake is released.

2 Claims, 2 Drawing Figures

RETAINING SPRING FOR THE BRAKE SHOE OF A SPOT TYPE DISC BRAKE

CROSS-REFERENCE TO RELATED APPLICATION

This is a continuation of application Ser. No. 135,019, filed Mar. 28, 1980, now abandoned, which is a continuation of application Ser. No. 970,896, filed Dec. 19, 1978, now abandoned.

BACKGROUND OF THE INVENTION

This invention relates to a retaining spring for a brake shoe, including a backing plate and a friction pad, of a spot-type disc brake, in particular for automotive vechicles, with a spring leg extending in a tangential direction along a lateral surface of the backing plate, the spring leg having ends which, radially outwardly in relation to the brake disc, are in resilient abutting engagement with guide elements detachably connected with the brake, and with at least one saddle extending from the spring leg and embracing the radial outer edge of the backing plate and resting on the front surface of the backing plate.

The use of retaining springs for the brake shoes of spot-type disc brakes is necessary in order to resiliently clamp the brake shoes in their guides in the brake housing to prevent them from vibrating as a result of shocks and avoid rattling noise in the released state of the brake. Further, the retaining springs prevent automatic movement of the brake shoes in the direction of the brake disc when the brake is released, thus avoiding rubbing contact with the brake disc.

A retaining spring of this type is known from the German Printed Specification No. Dt-OS 2,262,695. The leg of this spring abuts against the lateral surface of the backing plate on the side close to the brake disc and engages with each of its two ends underneath a guide pin which is detachably fixed in the brake housing and extends through an opening in the backing plate in order to guide the latter slidably parallel to the brake-disc axis. The central section of the spring leg is formed by two saddles bent in the form of a U and embracing the radial outwardly directed edge of the backing plate, the saddles being connected with each other by a bridge resting against the lateral surface of the backing plate which is remote from the brake disc. This known retaining spring has the disadvantage of tending to twist the radial inner end of the brake shoe in the direction of brake release so that an excessive brake clearance may occur between the brake shoe and the brake disc when the resistance of the brake actuating members is insufficient with the brake released. The undesired result in an excessive actuating travel when the brake is applied again.

SUMMARY OF THE INVENTION

It is an object of the present invention to provide a retaining spring of the type initially referred to which clamps the brake shoe in its guides under friction engagement and holds the brake shoe in a position parallel with the plane of the brake disc while permitting ease of manufacture and assembly.

A feature of the present invention is the provision of a retaining spring for a brake shoe including a backing plate and a friction pad of a spot-type disc brake comprising: at least a first member resiliently engaging one surface of the braking plate and both of a pair of guide elements for the brake shoe; at least a second member resiliently engaging the other surface of the braking plate and both of the guide elements; and at least a third member interconnecting the first and second members and resiliently engaging on outer edge of the backing plate.

According to the invention the saddle of the retaining spring includes, on the side of the backing plate remote from the spring leg, at least one spring arm extending parallel with the spring leg, the end of which spring arm rests against a component of the brake resiliently radially outwardly and which is preloaded such that the abutment forces at its end are equal to the abutment forces at the ends of the spring leg. This results in an equilibrium of forces on both sides of the brake-shoe guide provided on the backing plate so that the alignment of the brake shoe parallel with the brake disc which is predetermined by the guide of the brake shoe is not adversely affected. Further, the retaining spring of this invention admits to ease of manufacture by the arrangement of the spring arms on the saddles. In addition, it permits easy assembly by the clamping of the retaining spring onto the backing plate prior to the brake shoe being mounted.

In an advantageous embodiment of the retaining spring of this invention, the saddle is disposed in the middle of the spring leg and has two spring arms extending in opposite directions. When the retaining spring is designed in this manner, the guide elements on which the retaining spring takes support may be disposed laterally close to the brake shoe.

In a very simple embodiment of the retaining spring of this invention, the retaining spring includes a saddle embracing the backing plate and a spring arm arranged on either end of the spring legs attached to the saddle. This improvement of the retaining spring makes it, however, necessary to provide guide elements within the tangential ends of the backing plate for abutting engagement of the spring leg therewith. In this embodiment, the spring arms may face each other and likewise take support on the guide elements against which the spring leg abuts. The same effect with respect to the guiding and support of the brake shoe can be obtained by arranging the spring arms so they are turned away from each other and take support upon further guide elements of the brake. The retaining spring of this invention is, however, preferably used on brake shoes guided by means of guide pins which extend through openings in the backing plate. In this arrangement, the ends of the spring legs and of the spring arms take support upon the guide pins.

According to another proposal of the invention, an advantageous improvement of the retaining spring is to connect the ends of the spring arms by bridges. This results in an increased stiffness of the retaining spring. Further, designing the retaining spring in this manner results in a symmetrical spring shape ensuring like abutment forces at all points. Also, the risk of wrongly mounting the spring is reduced materially. The same advantageous effects can be achieved by connecting the ends of the spring arms with the ends of the spring legs by means of bridges. In this arrangement, according to another proposal of the invention, the bridge-connected ends of the spring leg and the spring arms may extend radially outwardly beyond the edge of the backing plate. This facilitates assembly because pressing down of the bridges permits tensioning of the spring which facilitates the insertion of the guide elements. Another advantage afforded by this spring design is that it can also be used for holding the brake shoes of fist-type caliper disc brakes, in which case the bridges of the retaining spring take support upon that portion of the brake caliper detachably connected with the brake carrier that straddles the brake disc.

In a preferred embodiment of the invention, the retaining spring includes a sheet strip having indentations or cutouts extending in the longitudinal direction of the sheet strip and being of a width corresponding to the thickness of the backing plate. This design permits a particularly simple manufacture of the retaining spring.

In another advantageous embodiment of the retaining spring, the spring arms are preloaded in the direction of the spring leg. This preload permits clamping of the retaining spring on the backing plate of a brake shoe so that the retaining spring and brake shoe can be sold to the shops as one frictionally engaged unit to be mounted as such. In addition, this preload prevents an undesired clearance of the brake shoe which may occur when the spring arms move away from the lateral surface of the backing plate when the brake is applied.

In the radial direction, the spring arms are preferably preloaded in such a manner that the abutment forces at their ends are equal to the abutment forces at the ends of the spring legs. The retaining spring thereby ensures the desired alignment of the brake shoe parallel with the brake disc in any mounting position. The danger of confusion when the retaining spring is fitted is avoided. Preferably, the ends of the spring arms may have supporting legs extending radially inwardly. These legs provide for stabilization of the position of the spring prior to the fitting of the brake shoe. Further, these legs may be so designed that fitting of the spring with its supporting legs extending radially outwardly is not possible. In this manner, it is ensured that the spring allows fitting only in a position in which the proper preload of the spring arms is present.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
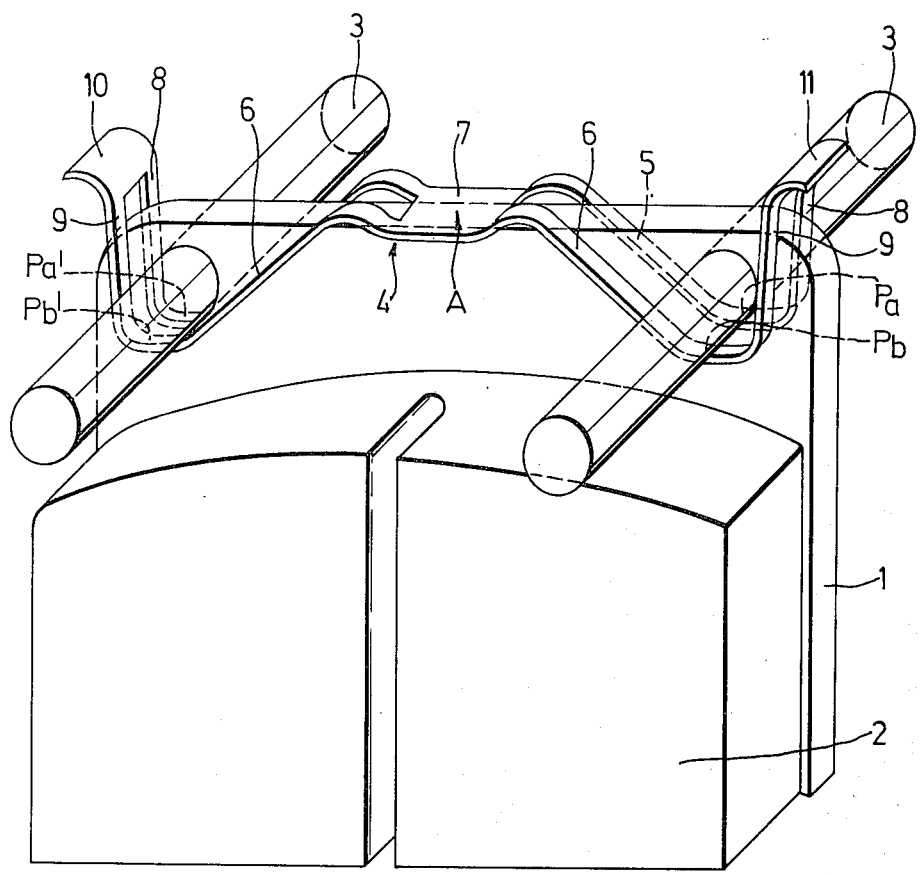
FIG. 1 shows a perspective view of a brake shoe guided on pins including a retaining spring made of sheet metal in accordance with the principles of the present invention.

The brake shoe illustrated in FIG. 1 includes a backing plate 1 and a friction pad 2. The radial outer edge area of backing plate 1 includes openings through which guide pins 3 extend. The guide pins 3 are aligned parallel with the axis of rotation of the brake disc (not shown) and serve to support and guide the brake shoe in a brake housing (not shown). The retaining spring 4 which serves to clamp the brake shoe in position relative to the guide pin 3 is composed of a spring leg formed by sections 5 and 6, the saddle 7 embracing the radial outer edge of backing plate 1, and the spring arms 8 and 9. The ends of spring arms 8 and 9 are connected by bridges 10 and 11. This arrangement results in symmetrical form of the retaining spring 4 which in essence includes two rectangular frames connected along their narrow sides.

The distance between sections 5 and 6 of the spring leg and the spring arms 8 and 9 corresponds to the thickness of backing plate 1 so that the retaining spring 4 follows the axial movements of the brake shoe on guide pins 3 when the brake is applied.

By virtue of the symmetric design of the retaining spring, abutment forces Pa, Pa', Pb and Pb' of equal magnitude are obtained, thereby ensuring an alignment of backing plate 1 relative to guide pins 3 parallel with the brake disc. The force A, which is equal to the sum of the forces P, prevents the brake shoe from self-motion relative to guide pins 3.

Retaining spring 4 illustrated in FIG. 1 is particularly suitable for use in spot-type disc brakes of the first-type caliper design in which the backing plates of the brake shoes rest on guide surfaces in the brake carrier radially inwardly, without the provision of guide pins. In this application, bridges 10 and 11 take support upon guide surfaces provided on the side facing the brake shoe on the brake caliper straddling the brake disc, which caliper can be dismounted from the brake carrier for brake shoe replacement.

Figure 2:
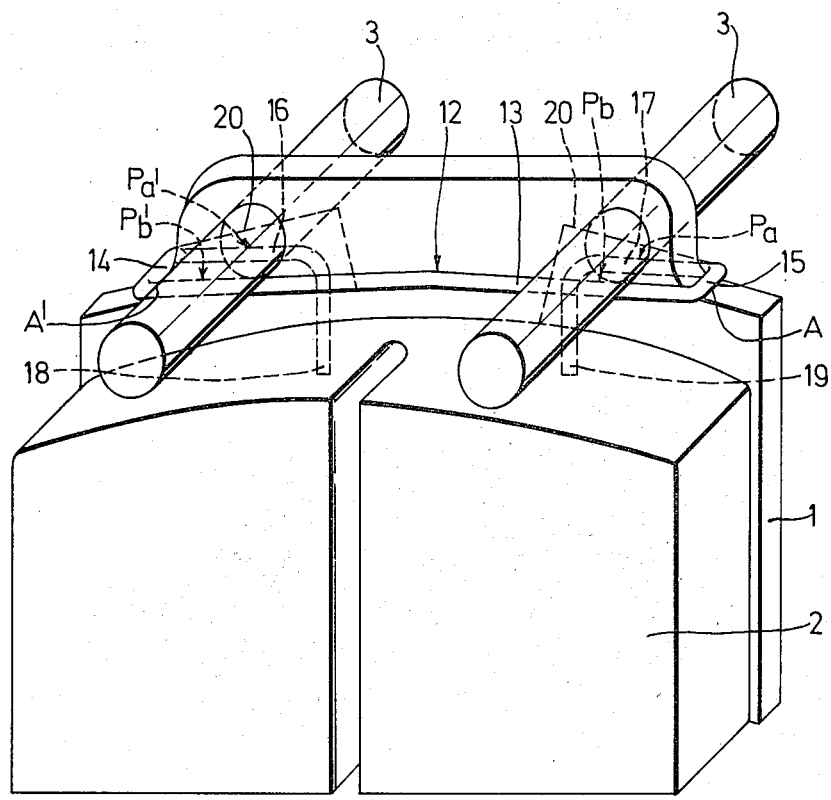
FIG. 2 shows a perspective view of a brake shoe guided on pins including a retaining spring which is made of wire in accordance with the principles of the present invention.

In the embodiment shown in FIG. 2 the spring leg 13 of the bent wire retaining spring 12 has at either end saddles 14 and 15 embracing the edge of the backing plate in the form of a U and carrying confronting spring arms 16 and 17. The ends of spring arms 16 and 17 have radially inwardly extending supporting legs 18 and 19. The abutment forces of retaining spring 12 on guide pins 3 are identified in the same manner as in the embodiment of FIG. 1. The forces urging backing plate 1 of the brake shoe against guide pins 3 are identified by A and A'.

In order to ensure that in the asymmetric design of retaining spring 12 the abutment forces Pa and Pa' are equal to the abutment forces Pb and Pb', spring arms 16 and 17 are exposed to an additional preload. Therefore, with the tension released, the spring arms' 16 and 17 extension radially outwardly is increased by the amount indicated by the broken lines 20. In addition, spring arms 16 and 17 are also preloaded in the direction of spring leg 13 so that retaining spring 12 is firmly clamped in position relative to backing plate 1 in an axial direction. As shown in the drawing, the spring leg 13 and spring arms 16 and 17 engage throughout their entire length the adjacent surface of the backing plate.

While we have described above the principles of our invention in connection with specific apparatus it is to be clearly understood that this description is made only by way of example and not as a limitation to the scope of our invention as set forth in the objects thereof and in the accompanying claims.

We claim:

1. A retaining spring for a brake shoe of a spot-type disc brake comprising:
   a backing plate for said brake shoe including an outer central portion and two outer side portions each secured to a different side of said central portion, said central portion and said two side portions being parallel to one surface of a brake disc;
   a pair of spaced parallel guide elements disposed parallel to a rotational axis of said brake disc to guide said brake shoe toward and away from said one surface of said brake disc, each of said pair of guide elements slidably engaging a different hole through said central portion inwardly spaced from an uninterrupted planar outer edge of said central portion contained in a first plane perpendicular to said one surface of said brake disc;

a first member parallel to and resiliently engaging throughout its entire length a first surface of said central portion and both of said two end portions parallel to said one surface of said brake disc and resiliently engaging both of said pair of guide elements at said first surface with a predetermined preload;

a second member parallel to and resiliently engaging throughout its entire length a second surface of one of said two side portions and an adjoining portion of said central portion parallel to said first surface and resiliently engaging an associated one of said pair of guide elements at said second surface with said predetermined preload;

a third member parallel to and resiliently engaging throughout its entire length said second surface of the other of said two side portions and an adjoining portion of said central portion and resiliently engaging the other of said pair of guide elements at said second surface with said predetermined preload, their second and third members being spaced from each other and being additionally preloaded toward said first member; and a pair of fourth planar members each contained in a second plane parallel to and below said first plane extending substantially parallel to said axis, one of said pair of fourth members interconnecting adjacent ends of said first and second members and resiliently engaging an outer edge of said one of said two side portions and the other of said pair of fourth members interconnecting adjacent ends of said first and third members and resiliently engaging an outer edge of said other of said two side portions.

2. A spring according to claim 1, further including a supporting leg connected to an end of each of said second and third members remote from an associated one of said pair of fourth members, each of said supporting legs extending radially inward.

* * * * *